United States Patent [19]
Classens et al.
[11] 4,451,692
[45] May 29, 1984

[54] METHOD OF MANUFACTURING A LONGITUDINALLY WATERTIGHT CABLE AND LONGITUDINALLY WATERTIGHT CABLE THUS OBTAINED

[75] Inventors: Adrianus M. M. Classens, Delft; Frederik W. Aalbertsberg; Hendrika G. Van Marle, both of Waddinxveen, all of Netherlands

[73] Assignee: U.S. Philips Corporation, New York, N.Y.

[21] Appl. No.: 404,155

[22] Filed: Aug. 2, 1982

Related U.S. Application Data

[63] Continuation of Ser. No. 219,159, Dec. 22, 1980, abandoned.

[30] Foreign Application Priority Data

Jan. 8, 1980 [NL] Netherlands ........................ 8000084

[51] Int. Cl.3 ........................ B32B 25/20; H01B 7/28
[52] U.S. Cl. .................................... 174/23 C; 156/48; 428/383; 428/389; 428/390; 428/391
[58] Field of Search ........................ 156/48; 174/23 C; 428/375, 379, 390, 391, 389, 383

[56] References Cited

U.S. PATENT DOCUMENTS

| | | | |
|---|---|---|---|
| 3,065,194 | 11/1962 | Nitzsche et al. . | |
| 3,110,689 | 11/1963 | Smith . | |
| 3,137,665 | 6/1964 | Retford . | |
| 4,106,961 | 8/1978 | Kreuger et al. | 156/48 |
| 4,164,617 | 8/1979 | Van Kesteren | 174/23 C |

*Primary Examiner*—Lorraine T. Kendell
*Attorney, Agent, or Firm*—Norman N. Spain

[57] ABSTRACT

A method of manufacturing a longitudinally watertight cable in which a sealing mixture of a vulcanizable silicone rubber, a diluent and a filler is provided in the cable core and between the cable core and the sheath, which mixture, after curing, forms a watertight stopper. According to the invention, a bivalent or trivalent metal salt of a higher fatty acid or a mixture of higher fatty acids is used as a filler. A sealing mixture is preferably used in the method which comprises 15–25% by weight of a multicomponent silicone rubber, 35–45% by weight of silicone oil and 35–45% by weight of calcium stearate. The sealing mixture can be provided, in a blockwise manner, by means of an injection technique.

5 Claims, No Drawings

METHOD OF MANUFACTURING A LONGITUDINALLY WATERTIGHT CABLE AND LONGITUDINALLY WATERTIGHT CABLE THUS OBTAINED

This is a continuation of application Ser. No. 219,159 filed Dec. 22, 1980, now abandoned.

The invention relates to a method of manufacturing a longitudinally watertight cable which comprises a number of conductors situated within a sheath, in which a liquid sealing mixture which comprises a vulcanizable silicone rubber, a diluent and a filler is provided in the space between the conductors and the sheath, which mixture forms a watertight stopper after vulcanization of the rubber.

Such a method is disclosed inter alia in Netherlands Patent Application No. 7705840 in the name of Applicants. The choice of the ingredients of the silicone rubber-containing sealing mixture is of great importance for obtaining good results.

In particular the filler and the compatibility of the filler with the other ingredients of the sealing mixture have an important influence on the final results, that is, on the extent of longitudinal watertightness also at long terms and on maintaining a flexible character of the cable.

The fillers used so far in silicone rubber-containing sealing mixtures, for example, silicic acid, chalk, talc quartz fluor, and clay all have disadvantages which are related to the processing properties of the sealing mixture, the adhesion characteristic of the sealing mixture after vulcanisation of the rubber, and the electrical properties of the final watertight stopper.

The present invention provides a method with which longitudinally watertight cables with good electrical properties can be manufactured in an optimum manner.

The invention relates more in particular to a method of the kind mentioned in the opening paragraph which is characterized in that a salt derived from a bivalent or trivalent metal and from a higher fatty acid or from a mixture of higher fatty acides, or a mixture thereof, is used as a filler.

An example of a suitable filler is aluminium stearate, aluminium palmitate, zinc stearate or zinc palmitate.

Particularly useful is an alkaline earth metal salt of a higher fatty acid or a mixture of higher fatty acids. An example hereof is calcium palmitate. Good results are especially achieved with calcium stearate. This salt can be used in a pure form. It is recommended, due to the favourable price, to use the commercially available technical mixture of calcium salts of higher fatty acids known as "calcium stearate" which roughly has the following composition: $C_{12}$—0.5%; $C_{13}$—0.5%; $C_{14}$—2.5%; $C_{15}$—1.0%; $C_{16}$—47%; $C_{17}$—4.5%; $C_{18}$—38%; $C_{18}$ (oleic acid)—5.0%; $C_{19}$—1.0% and $C_{20}$—0.5%.

The expression, "higher fatty acid" is understood to mean an aliphatic or olefinic carboxylic acid having from 12 to 24 carbon atoms.

Silicone oil is preferably used as a diluent in the sealing mixture used in the method according to the invention.

Quite suitable is a sealing mixture which contains 15–25% by weight of vulcanizable silicone rubber, 35–45% by weight of silicone oil and 35–45% by weight of calcium stearate.

The viscosity of this sealing mixture can be varied within the above-mentioned limits by varying the percentages by weight of the various ingredients. On the average, the sealing mixture has a favourable comparatively low viscosity with a minimum value of approximately 1500 m Pa.S, in combination with a comparatively high yield-point stress which may even reach a value exceeding 200 N/m$^2$. The yield-point stress (TJ) is the maximum shear stress in a layer of liquid of thickness x, where the velocity variation dv/dx has the value zero.

Surprisingly the viscosity and the yield-point stress are favourably influenced by the choice of the mixing process of the ingredients. Experiments have demonstrated, for example, that a homogeneous mixture of 20% by weight of silicone rubber, 40% by weight of silicone oil and 40% by weight of calcium stearate obtained by simple stirring has a viscosity of 3000 m Pa.s and a yield-point stress of 80 N/m$^2$. After an intensive mixing operation the viscosity proved to have decreased to approximately 1500 m Pa.s and the yield-point stress increased to 230 N/m$^2$.

The favourable combination of comparatively low viscosity and high yield-point stress makes it possible to apply the sealing mixture, in a blockwise manner, by injection in the finished cable core, that is into the assembly of stranded insulated conductors. The sealing blocks may have a length of, for example, 20 cm which are arranged regularly, for example, every 1 or 2 meters of cable length. The sealing mixture is introduced from the circumference of the cable core into the heart of the cable core by an injection method without the sealing mixture flowing away in the longitudinal direction (axially) of the cable core over too large a distance and without the mixture dripping from the cable core. It should be borne in mind that the flow resistance of the cable core in the axial direction is considerably lower than that in the radial direction.

Another surprising aspect of the above-mentioned sealing mixture is that after vulcanisation of the silicone rubber sufficient adhesion to the materials of the sheath is obtained. The result is a deformation-resistant but still flexible stopper which, due to the just sufficient adhesion, produces a permanent longitudinal watertightness while maintaining sufficient flexibility.

The filler used in the sealing agent is sufficiently soft not to cause undesired detrition of the injection apparatus. Furthermore, in spite of the large quantity of filler processed in the sealing agent, a flexible soft rubber stopper is obtained after vulcanisation which does not contain any substances which may exude in disturbing quantities. The vulcanisation time of the silicone rubber processed in the agent which depends on the percentage of the catalyst and crosslinking agent used is not adversely influenced by the filler. The dielectric properties of the rubber used ore also influenced only to a small extent by the filler used according to the invention in contrast with most of the known fillers.

A further advantage of the filler used is the favourable specific weight which differs only slightly from the specific weight of the other constituents in the above-mentioned sealing mixture so that upon storage or during use of the sealing mixture no segregation and in particular no sagging of the filler occurs. The sealing mixture furthermore comprises no substances which are detrimental to health and it does not attack the synthetic resin insulation material of the conductors and the materials of the sheath.

The sealing mixture is suitable for use in all current materials for conductor insulation, inter alia polythene and P.V.C. The mixture may be used in symmetrical cables with pairs and star groups in layer and bundle construction and for filling spaces between coaxial pipes. The conductors may be electric conductors provided with insulation, for example, copper wire, but also optical light guides. The sheath of the cable core can be constructed any of several traditional ways. Usually the sheath comprises a synthetic foil wound with overlap around the cable core and in particular a polyester foil which in turn is covered with one or several synthetic sheaths of, for example, polythene. In order to obtain a radial watertightness and/or increased tensile strength, a metal sheath, for example a lead or aluminium sheath, may be provided between the synthetic resin sheath, if desired in combination with other layers, for example, a layer of wound foil. Sealing mixture may be provided between the layers of the sheath.

In a further favourable embodiment of the method in accordance with the invention a sealing mixture as described above is used which contains 15–25% by weight of a multicomponent silicone rubber which is vulcanisable at room temperature and which upon vulcanisation shows an addition reaction in which no low molecular reaction products are formed.

Such a rubber is known as such, for example, by the commercial name of Siloprene. The rubber comprises in particular a rubber component on the basis of polydimethylsiloxane with vinyl groups in the final position (Siloprene U), a crosslinking agent on the basis of a polysiloxane with reactive hydrogen atoms (Siloprene SIH) in a maximum weight percentage of 1% and a platinum catalyst (Siloprene Pt) in a maximum weight percentage of 0.02%. The rubber may furthermore comprise a dye. This known rubber is recommended as a moulding rubber.

It would be attractive in itself to use this rubber as a waterstop material in cables, because no low-molecular products are released which may attack the material of the conductor insulation and of the sheath. However, the rubber as such or in combination with the usual fillers does not adhere to the said materials so that no sufficient longitudinal watertightness can be obtained.

A satisfactory adhesion, however, is obtained if the rubber is used in the sealing agent used in the method according to the invention which in addition to the rubber comprises 35–45% by weight of calcium stearate and 35–45% by weight of silicone oil.

The sealing agent used in the method according to the invention upon storage is divided into two individual components each comprising a part of the rubber component, the diluent and the filler, one component comprising the crosslinking agent and the other component comprising the catalyst. Both components individually have a long potlife. The sealing mixture obtained after mixing is vulcanisable at room temperature and can be processed during one day.

The invention will now be described in greater detail with reference to the example.

EXAMPLE 40 kg of silicone oil known commercially as Baysilon M 25 and 40 kg of technical calcium stearate are added to 20 kg of a silicone rubber on the basis of polydimethylsiloxane which is marketed by Bayer under the tradename Siloprene U. The whole is mixed for one hour, a first portion of 100 kg of mixture being obtained. In a corresponding manner, a second portion of 100 kg is manufactured. 2 kg of crosslinking agent (polysiloxane of commercial name, "Siloprene SIH") and 400 g of a blue phthalocyanine dye are added to the first portion. After mixing for 1 hour the so-called V-component (crosslinking agent component) is obtained. The second 100 kg portion is provided with 30 g of a platinum catalyst with commercial name, "Siloprene Pt". After mixing, the so-called K-component (catalyst component) is obtained.

The V- and K-components are then mixed, for example, in a ball mill. The resulting sealing mixture which is fully vulcanised after approximately one week has a viscosity of approximately 3000 m Pa.s and a yield point stress of approximately 80 $N/m^2$.

The sealing mixture is provided, in a blockwise manner, in a telephony cable as follows.

The cable core of a telephony cable consisting of 50 star groups of conductors comprising a copper wire having a diameter of 0.5 mm and an insulation of polythene provided around the copper wire in a thickness of 0.32 mm was built up by providing around a core consisting of 4 star groups layers of successively 10, 15 and 21 star groups with alternately left and right screwthread.

The above sealing mixture is provided over a length of 20 cm in the cable core at regular distances of 2 m by injecting the mixture from the outer surface into the heart of the cable core. The space between the conductors is filled entirely. Around the cable core a polyester foil is wound with overlap and is provided on its outside with and adhesive which adheres to the inner surface of the polythene inner sheath provided subsequently by extrusion. The sealing mixture is provided on the inner sheath and an aluminium foil folded with overlap and provided on its outer surface with an adhesive which adheres to the polythene intermediate sheath is then provided. Finally a layer of armouring wires is wound around the intermediate sheath and protects the cable against damages.

What is claimed is:

1. In a method of manufacturing a longitudinally watertight cable comprising positioning a number of conductors within a sheath, filling the space between the conductors mutually and between the conductors and the sheath with a liquid sealing mixture comprising 15–25% by weight of a vulcanizable silicone rubber, a diluent and a filler, said liquid sealing mixture being convertable to a watertight seal by vulcanization of the silicone rubber, then vulcanizing said silicone rubber to thereby convert said sealing mixture to a watertight seal between said conductors and between said conductors mutually, the improvement wherein the vulcanizable silicone rubber is a multicomponent silicone rubber vulcanizable at room temperature through an addition reaction in which no low molecular weight reaction products are formed, the diluent is a silicone oil and the filler is a salt of a higher fatty acid or a mixture of higher fatty acids with a bivalent or trivalent metal, said salt being present in an amount about at least 35% by weight.

2. The method of claim 1 wherein the metal is an alkaline earth metal.

3. The method of claim 2 wherein the salt is calcium stearate.

4. The method of claim 3 wherein the liquid sealing mixture consists essentially of 15–25% by weight of a silicone oil and 35–45% by weight of calcium stearate in addition to said vulcanizable silicone rubber.

5. A longitudinally watertight cable obtained by the method of claim 1.

* * * * *